(12) United States Patent
Balaster

(10) Patent No.: US 9,931,707 B2
(45) Date of Patent: Apr. 3, 2018

(54) PORTABLE ARC WELDER

(71) Applicant: Ammon Nazareth Balaster, Boulder, CO (US)

(72) Inventor: Ammon Nazareth Balaster, Boulder, CO (US)

( * ) Notice: Subject to any disclaimer, the term of this patent is extended or adjusted under 35 U.S.C. 154(b) by 288 days.

(21) Appl. No.: 14/806,897

(22) Filed: Jul. 23, 2015

(65) Prior Publication Data

US 2017/0021440 A1   Jan. 26, 2017

(51) Int. Cl.
*B23K 9/095* (2006.01)
*B23K 9/12* (2006.01)
*B23K 9/133* (2006.01)
*B23K 9/173* (2006.01)

(52) U.S. Cl.
CPC ............ *B23K 9/124* (2013.01); *B23K 9/0953* (2013.01); *B23K 9/1333* (2013.01); *B23K 9/173* (2013.01)

(58) Field of Classification Search
CPC .... B23K 9/0953; B23K 9/124; B23K 9/1333; B23K 9/173
See application file for complete search history.

(56) References Cited

U.S. PATENT DOCUMENTS

| | | | | |
|---|---|---|---|---|
| 6,225,596 | B1* | 5/2001 | Chandler | B23K 9/1056 219/130.1 |
| 9,399,263 | B2* | 7/2016 | Bashore | B23K 9/32 |
| 2009/0057285 | A1 | 3/2009 | Basjore et al. | |
| 2010/0051595 | A1* | 3/2010 | Diedrick | B23K 9/124 219/137 R |
| 2012/0241430 | A1* | 9/2012 | Luck | B23K 9/1006 219/137.7 |
| 2012/0248080 | A1* | 10/2012 | Hutchison | B23K 9/0956 219/130.21 |
| 2014/0097164 | A1* | 4/2014 | Beistle | B23K 9/1043 219/130.33 |
| 2015/0375331 | A1* | 12/2015 | Hutchison | B23K 9/09 219/137 R |

* cited by examiner

*Primary Examiner* — Ryan A Reis

(57) ABSTRACT

In embodiments, a welding apparatus includes an automated wire feed mechanism to output wire at a wire feed rate, where the wire is to provide a welding arc to a weld site. The wire feed rate is based at least in part on selected power to be provided to the weld site. Additional embodiments are described and claimed.

20 Claims, 5 Drawing Sheets

PORTABLE ARC WELDER

This application claims priority to U.S. Provisional Patent Application Ser. No. 62/027,924, filed Jul. 23, 2014, the content of which is hereby incorporated by reference.

TECHNICAL FIELD

Embodiments pertain to portable arc welding.

BACKGROUND

Welding enables joining of two or more objects, creating a joint that is typically stronger than, e.g., low temperature soldered joints. One form of welding is arc welding, accomplished by applying an electric arc to surfaces of objects to be joined, melting base material, and feeding filler material to create a molten pool, e.g., by feed of a weld wire that melts and forms a "puddle" to form a weld that joins the objects.

Arc welding typically requires a high power (e.g., large electric current). Typically arc welding is accomplished via use of a stationary arc welder that receives power from a stationary source such as from a power grid, as alternating current (AC). Arc welding typically occurs at a location that can receive power from the power grid. In remote locations, if arc welding is to be performed, use of an electric generator may be needed to supply ample power for an arc welder.

DETAILED DESCRIPTION

Figure 1:
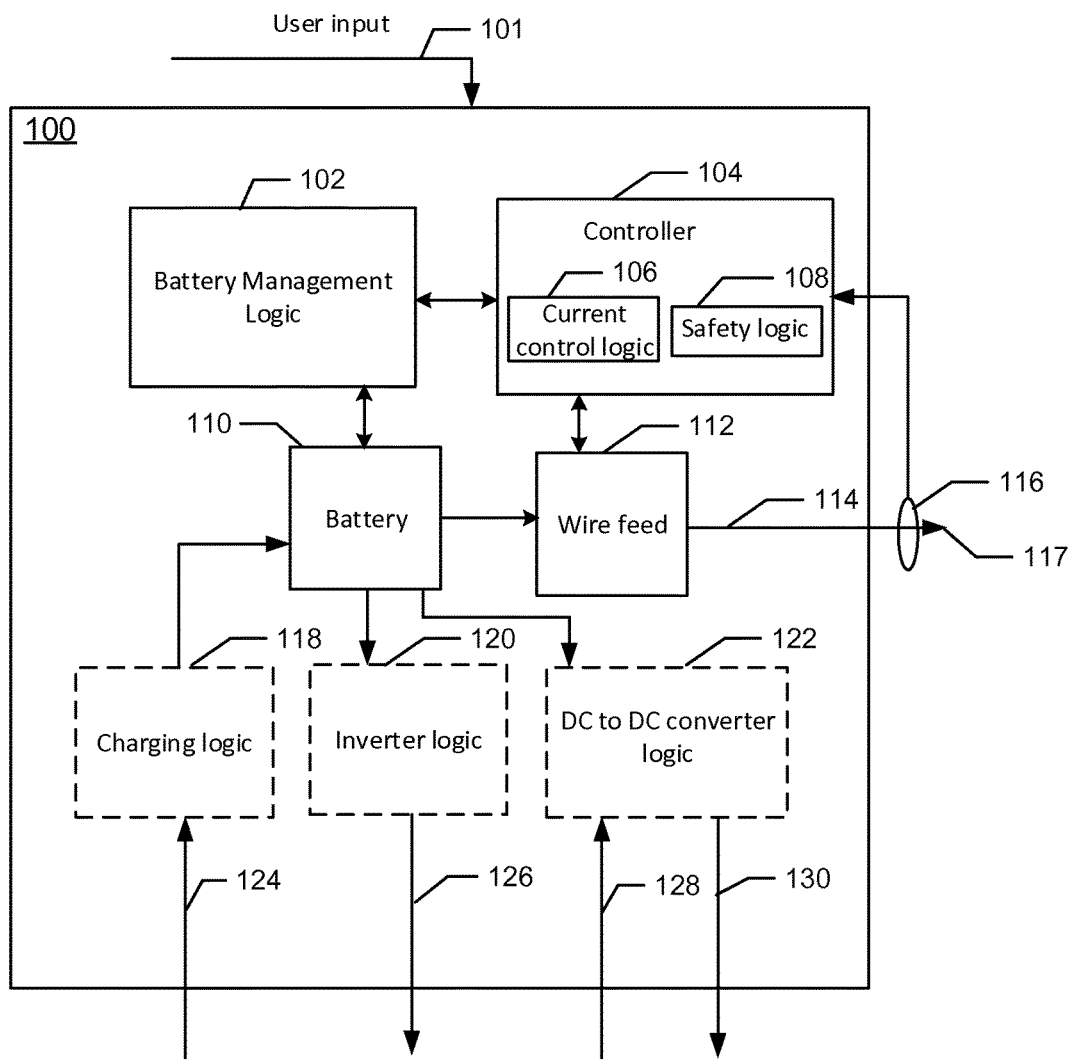
FIG. 1 is a block diagram of an apparatus, according to an embodiment.

In embodiments, a welding apparatus provides a portable device with which to weld. In embodiments, the welding apparatus can be carried within a back pack, or can be hand held, and permits welding to be conducted with relatively high power (e.g., up to 300 amperes of steady state current). The welding apparatus can include a power source that is capable of providing high power for welding, and can be adjusted to provide power that can be selected for the welding application. Additionally safety features may be included to provide a "cold" welding tip upon halting of welding. These and other features are described within.

Embodiments may include one or more of the following features:

1) Low Contact Resistance Cell Interconnect/Battery Enclosure

Power to the welder may be supplied by high-power cells, such as LiFePO4 pouch cells that are capable of delivering steady state currents that may range as high as 300 amperes (A). Pouch cells may have no structural frame or enclosure, and can be constructed to be light in weight. Since the pouch cells have no rigid enclosure, a containment structure may be provided in the welder. In embodiments, an arc welder integrates a battery containment structure as an integral part of a battery cell interconnect system.

Reduction of circuit resistance may be employed in order to deliver high power in order to perform a weld. Dissipative power may be expressed as a square of current times resistance ($P=I^2R$). In order to provide for high currents (e.g., approximately 50 A to approximately 300 A) resistive elements of a welding circuit may be designed to have small resistance. The cells are typically selected to have low internal resistance, to avoid overheating. Cell connections and cables may be designed for minimum resistance.

Embodiments of the battery enclosure provide a very low contact resistance interconnect system for the battery cells. The interconnect/enclosure system also functions to provide a flexible thermal management (e.g., heat sink) for the cells and provides a compact and rugged protective enclosure for the cells.

2) Safety Shut-Down

In a high current battery application such as welding, it is advantageous to maintain the battery power system within a safe operating parameter range. In embodiments, the integrated power system includes a battery monitoring controller that monitors individual cells or parallel cell modules within the battery, and may terminate the welding process if any cell or module exceeds its predefined safe operating limit. This safety shut-down feature is accomplished by turning off power to a weld wire feed motor within the welder, which extinguishes the arc and load current. This safety shut-down feature maintains the battery system within its safe operating parameter range avoiding possible damage to the equipment and injury to the operator while also maximizing cycle life of the battery.

3) Weld Current Control

In embodiments the welding current is to be controlled by controlling a feed speed of a weld wire as it feeds into a molten weld puddle. Speed of the weld wire feed may be controlled through closed loop or open loop control of the weld wire feed motor. A high rate of feed typically results in a higher power consumption, and a low rate of feed typically results in a lower power consumption.

4) Selectable Voltage Tap

To weld over a wide range of metal thicknesses and power levels it is advantageous to have selectable or adjustable voltage. Embodiments provide selectable voltage through battery cell tap ports.

Use of tap ports in a multi-cell battery may present a difficulty in charging the battery, specifically in charging all cells to the same Full Charge State (FCS). Embodiments include a battery charger that can charge each cell to its full FCS without overcharging any cells, cases where a battery includes cells that have a wide difference in their initial charge state.

5) Retractable Weld Wire Cold Tip

A cold tip is a condition where a weld tip is disconnected from the power source. With very high current circuits, instead of use of an electro-mechanical "contactor" or relay, or expensive semiconductor devices, embodiments automatically retract the weld wire into a non-conductive wire tip (e.g., ceramic sleeve or other non-conductive sleeve) to isolate the tip from the weld wire. In embodiments, on releasing the weld gun trigger, a controller automatically retracts the exposed length of weld wire into the non-conductive tip to isolate the tip from the wire and from the power source.

6) Weld Wire Speed Current Control

Embodiments control weld current by adjusting a speed at which the weld wire is fed into the plasma arc forming a molten metal weld pool. This speed control may be done open or with closed loop feedback via a current sensor, e.g., a shunt or Hall type sensor.

7) A Fully Integrated Handheld/Wearable Arc Welder.

Embodiments incorporate one or more of the above-described features to enable a wearable (e.g., enclosed within a back pack, shoulder bag, or holster) arc welder suitable for field use that is capable of providing a high current arc (e.g., approximately 50 A to 300 A) while being portable, e.g., low weight (e.g., approximately 15 pounds or less; some embodiments weigh 6 pounds or less) and easily carried by a person due to small occupied space of the arc weld apparatus (e.g., volume of approximately 450 cubic inches for a backpack welder, approximately 1200 cubic inches for a "suitcase" welding system, and less than 150 cubic inches for an integrated portable handheld welder). Embodiments provide DC power to a weld wire feed control mechanism that is external to the energy supply portion. Embodiments may include an energy supply and control portion within a backpack or handheld case, which can enable transport into and within remote locations. Other embodiments include a hand held arc welder (volume of approximately 150 cubic inches, and weight of approximately 5 to 7 pounds) that includes energy supply (e.g., battery), weld wire and tip, weld wire spool, wire feed mechanism (e.g., wire feed motor) and control electronics to provide a high current arc (e.g., approximately 50 A to 300 A steady state), and may optionally include a safety mechanism to retract the weld wire into a non-conductive or sleeved tip when a trigger is released to result in a cold tip that can prevent accidental arcing at the tip. Other embodiments are also contemplated, and the above described embodiments are non-limiting.

FIG. 1 is a block diagram of an apparatus, according to an embodiment. Apparatus 100 includes battery management logic 102, controller 104, battery 110, wire feed 112, weld wire 114, and current sensor 116. Optionally, apparatus 100 also includes one or more of charging logic 118, inverter logic 120, and converter logic 122. The battery may include one or more high power cells, e.g., light weight lithium cells such as pouch cells that are capable of delivering 20-300 amperes of steady state current for extended periods of time and that enable arc welding to be performed. The controller 104 may be hardware such as a microcontroller, a processor that includes at least one core, a system on a chip (SOC), or other electronic circuitry, and may include firmware, software, or a combination thereof.

In operation, a user may select a weld current at which to operate the apparatus 100, e.g., via a user input (e.g., any one of a plurality of input devices such as a potentiometer, keyboard, mouse, verbal input, etc.). The user input may also be received from, e.g., a start switch such as a trigger switch to initiate advancement of the wire by the wire feed to establish the arc. In embodiments, a user pulls a trigger that sends a signal to the controller 104 to initiate an arc. Current control logic 106 within the controller 104 can initiate a start signal to the switch 111 to engage the battery 110 to the wire feed 112, and also to provide power to weld wire 114.

The wire feed 112 may be controlled by the controller 104, e.g., via the current control logic 106, to feed weld wire 114 at a feed rate so as to maintain a selected current or plasma arc level to the weld wire 114. The current level may be determined by the user input received, e.g., as a selection of weld power or weld current. The current control logic 106 may determine a rate of feed of the wire feed 112 to maintain an approximately constant weld current, through use of a current sensor 116 that can provide feedback for a feedback loop such as a closed loop feedback mechanism. Alternatively, the wire feed speed may be set manually by the user, e.g. with a potentiometer. A change in the weld current may be detected via the current sensor 116, and may cause the current control logic to adjust the rate of wire feed, e.g., by control of a wire feed mechanism (e.g., motor speed of a wire feed mechanism (not shown)) in order to maintain a steady weld current through the weld wire 114. In some embodiments, the controller 104 controls the wire feed 112 to create an intermittent arc, e.g., by rapidly stopping and starting the feed rate, which may be useful in certain welding applications, e.g., welding thin materials.

In embodiments, a trigger switch (not shown) is operated by the user. Squeezing the trigger switch can cause power to be sent to the wire feed motor to advance the weld wire and establish an arc. Alternatively the trigger can send a signal to the controller 104 to close a switch (not shown) that provides current to the wire feed 112 to operate the wire feed motor and to deliver power to the weld wire 114. When the user releases the trigger switch, the high current switch is opened, the power is disconnected and the arc extinguishes. In other embodiments releasing the trigger can send a signal to control logic 106 causing the wire feed 112 to stop feeding the wire, which extinguishes the arc and terminates flow of the welding current. Additionally, safety logic 108 within the controller 104 may generate a signal to cause the wire feed 112 to reverse the wire feed, e.g., retract a weld wire into an insulating welding tip isolating the tip from the powered wire. The weld wire tip may be retracted into a tip or sleeve, e.g., a ceramic sleeve in the welding tip (not shown), so as to prevent electrical contact of the wire with the tip to avoid accidental arcing at the tip or wire. Release of the trigger switch may also cause the controller 104 to open the power switch so as to remove power to the weld wire 114.

The battery management logic 102 may monitor a condition of each cell of one or more cells within the battery 110. If the battery management logic 102 detects a critical cell condition, e.g., low cell voltage, or high temperature, the battery management logic 102 may terminate power to the wire feed motor to stop the wire feed and terminate the welding current. Terminating the welding current quickly can prevent damage to the battery due to low cell voltage or high temperature.

Optionally, the apparatus 100 may include charging logic 118 to recharge the battery 110 from an external power source 124. The apparatus 100 may optionally include inverter logic 120 to enable alternating current (AC) 126 to be output from the apparatus 100 to operate other AC tools and appliances (e.g. a grinder or power drill). The apparatus 100 may optionally include direct current (DC) to DC converter logic 122 to convert a DC input 128 to a different DC voltage 130 to be made available externally to the apparatus 100.

Figure 2:
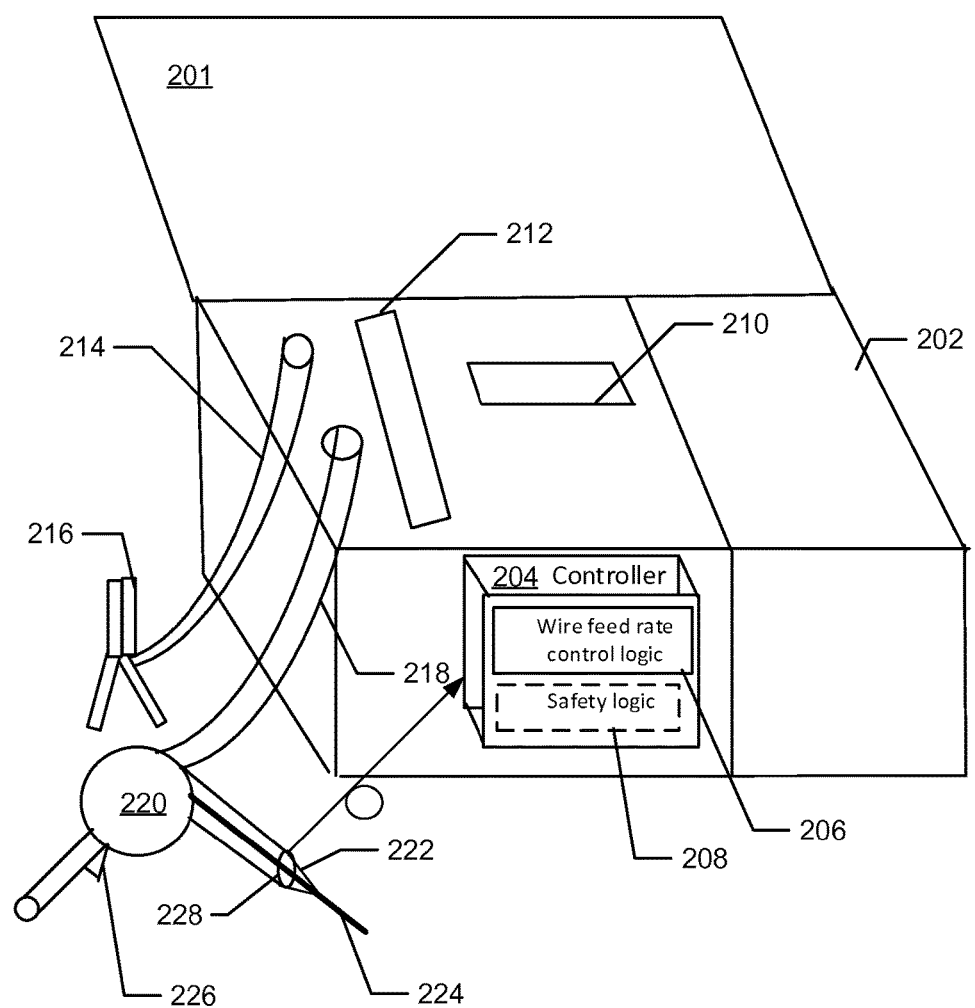
FIG. 2 is a block diagram of a system, according to another embodiment.

FIG. 2 is a block diagram of a system, according to an embodiment. System 200 includes an enclosure 201 that houses portions of a portable arc welder, and may house the portable arc welder in its entirety when the portable arc welder is not in use. The enclosure 201 includes a battery 202 that may include one or more cells, e.g., lithium cells such as a lithium "pouch cell" (e.g., LiFePO4), each cell having a capability of delivering steady state DC current for use in arc welding applications. A selection of a number of cells may be based on anticipated welding applications. That is, the greater the power requirement, the larger the number of cells to be included in the battery 202. The enclosure 201 of system 200 also includes circuitry 204 (also "controller"

herein) that includes wire feed rate control logic 206 and optionally includes safety logic 208. The enclosure 201 also includes a parameter control panel/readout 210, and air vent 212 that enables cooling during operation. A ground cable 214 couples the battery 202 to a ground clamp 216. A cable 218 couples the battery 202 to a weld gun 220 that includes a weld wire spool motor (not shown), weld wire tip 222, weld wire 224, and weld activation trigger switch 226.

In operation, the ground clamp 216 is attached to an electrically conductive work piece object to be welded to provide an electrical path for an arc welding circuit that includes the object to be welded. A user may select a power level (e.g., current level) via the parameter control panel 210. The user may squeeze the weld activation trigger switch 226 that causes the controller 204 to activate the weld feed mechanism in the weld gun 220 to advance the wire and establish an arc. When the weld wire 224 is brought proximate to the object(s) to be welded, an arc is established ("struck") at a weld site. The wire feed rate control logic 206 is to control a rate of wire feed to the weld site based on feedback received via a current detector 228. In embodiments, the wire feed rate to the weld site is to determine the current provided to the weld site. For example, a reduction in wire feed rate can result in a reduction in the current to the weld site, and an increase in the wire feed rate can result in an increase in current to the weld site. The wire feed rate control logic 206 may be configured in open loop or in a closed loop feedback configuration to control the arc current.

In embodiments, the safety logic 208, when included in the system 200, can detect when the user releases the trigger 226 and responsive to release of the trigger 226, the safety logic 208 can cause the wire feed motor to reverse direction and withdraw the weld wire 224 from the weld site. The weld wire can be withdrawn to within the tip 222 of the weld gun so that the weld wire is no longer exposed to potential accidental arcing, e.g., contact with a grounded conductive object. The tip 222 may be constructed from a non-conductive (e.g., a ceramic tip or tip sleeve), thus isolating the tip from the power source providing protection against accidental arcing.

In embodiments, the enclosure 201 may occupy up to 1200 cubic inches (or less) of space, and may weigh 15 pounds or less, and is therefore portable. In embodiments, the ground cable and ground clamp, and the weld cable and weld gun, may be storable within the enclosure 201, thus providing a self-contained portable arc welder capable of delivering as much as 300 amperes of steady state direct current to a weld site.

Figure 3:
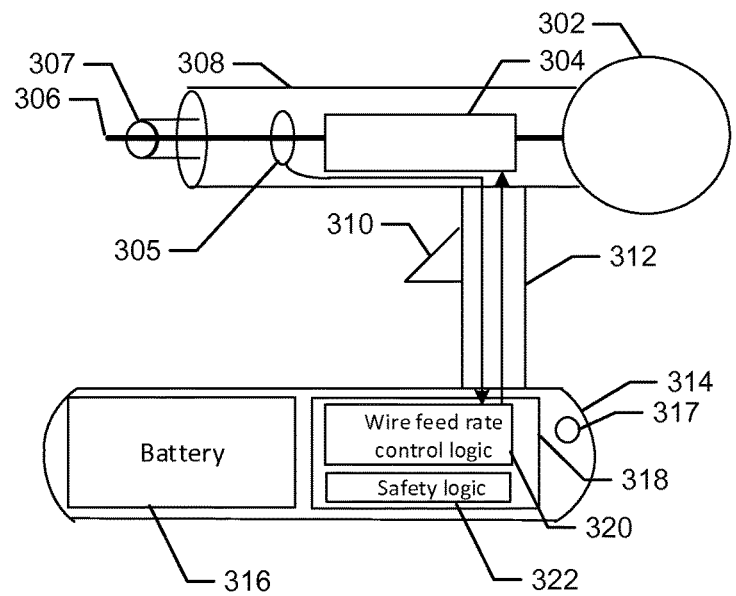
FIG. 3 is a block diagram of a system, according to another embodiment.

FIG. 3 is a block diagram of a system, according to embodiments of the present invention. System 300 can serve as a hand held portable arc welder and includes a wire spool 302, a wire feed mechanism 304 (e.g., feed motor or other wire feed propulsion mechanism), a current sensor 305, weld wire 306, a welding tip 307, an optional gas shield 308, a trigger switch 310, a handle 312, and a base 314 that includes battery 316, battery monitor and control circuitry 318, a wire feed rate control logic 320, a ground lead a grounding clamp (not shown), and optionally includes safety logic 322.

In operation, a user clamps the ground lead to the work piece and may select a value of weld current or feed rate of wire 306 to be delivered to a weld site (e.g. arc), via adjustment of a selection knob 317. The user may actuate the hand held weld system 300 by squeezing the trigger switch 310, which causes the wire feed rate control 320 to activate the wire feed mechanism 304 to deliver weld wire through the tip 307 to the arc at the selected rate. The wire feed rate control logic 320 may control a wire feed rate of the wire 306 to the tip 307 from the wire spool 302 by adjustment of the feed mechanism 304. The wire feed rate control logic 320 may receive feedback from the current sensor 305 (e.g., in a closed feedback loop) that provides information to determine whether to adjust the wire feed rate so as to maintain a substantially steady weld current. Optionally, the gas shield 308 may provide inert gas (e.g., helium, argon, etc.) to a weld site for inert gas welding.

When the user releases the trigger switch 310, the wire feed rate controller 320 stops the wire feed mechanism 304 from delivering wire so that the arc is extinguished and the current stops flowing. Optionally the safety logic 322 may cause the wire feed mechanism 304 to reverse the wire feed so as to retract the wire 306 into a non-conductive sleeved tip (e.g., a tip with a ceramic inner sleeve) so as to protect against accidental arcing of the tip 307 and possible burns to the user and to protect surrounding objects from damage or potential fire due to uncontrolled arcing.

The hand held system 300 may be light in weight (e.g., 6 pounds or less), and may occupy a small space (e.g., 150-200 cubic inches), which may permit the hand held system 300 to be held and operated in one hand of a user.

Figure 4:
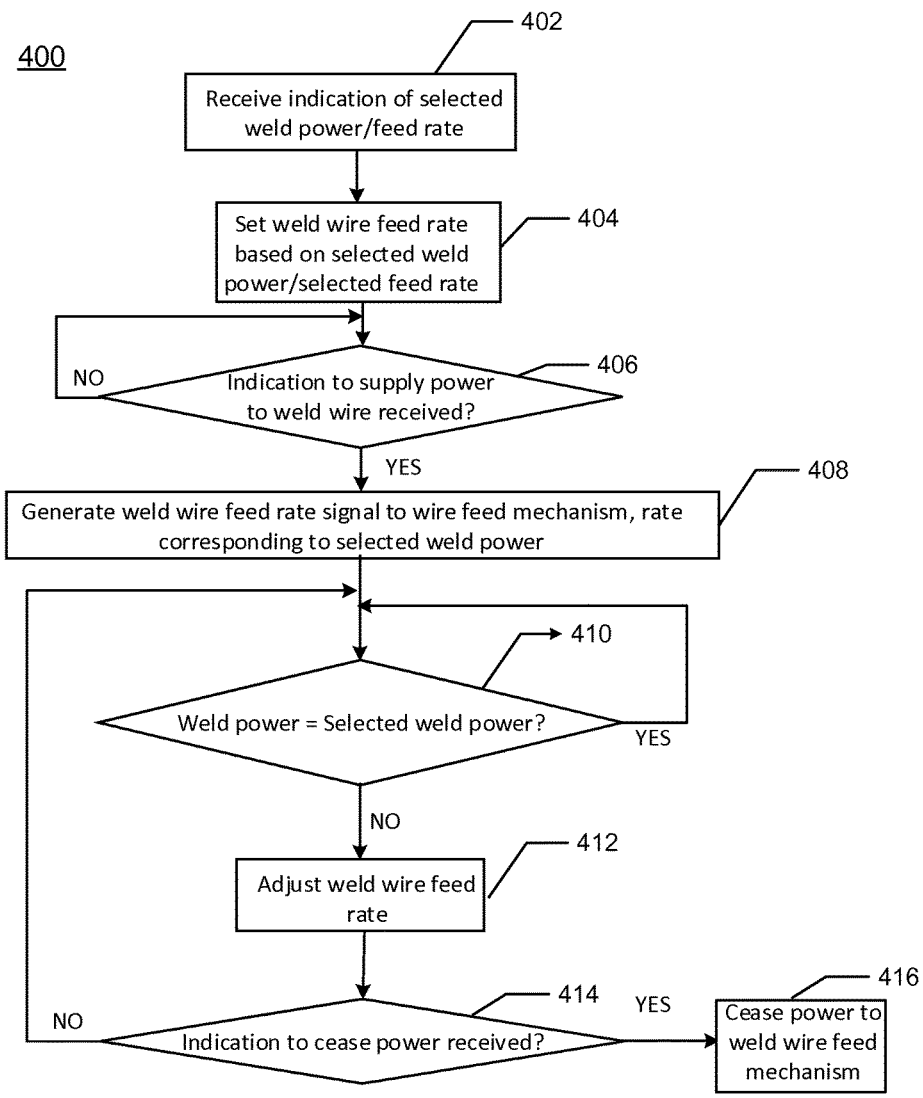
FIG. 4 is a flow diagram of a method, according to an embodiment.

FIG. 4 is a flow diagram of a method, according to an embodiment. At block 402 of method 400, control circuitry receives an indication of a selected weld power (or weld current or weld wire feed rate). Continuing to block 404, the control circuitry (e.g., wire feed rate control logic included in or executed by the control circuitry) is to set a weld wire feed rate based on the user selection. For example, when an arc is struck between the weld wire and one or more objects to be welded, an initial wire feed rate is set so as to produce an arc that consumes a desired weld power. The user may then adjust the selected current or wire feed rate to suit the weld application. Further adjustments may be made as the welding continues.

Advancing to decision diamond 406, if an indication to supply power to the weld wire is received (e.g., by the control circuitry, from a user via a switch such as a trigger switch) proceeding to block 408 the control circuitry causes power to be supplied to the weld wire feed mechanism to strike the arc. Additionally, the control circuitry generates a weld wire feed rate signal to be sent to the weld wire feed mechanism. The rate selected corresponds to the weld power, current, or feed rate selected.

Advancing to decision diamond 410, if measured weld current is equal to the selected weld current as measured by a current sensor, no change is made to the weld wire feed rate. The control circuitry continues to monitor the weld current at decision diamond 410. If the control circuitry detects a difference between the measured weld current and the selected weld current, proceeding to block 412 the control circuitry adjusts the weld wire feed rate (by adjusting a feed rate of a weld wire feed mechanism) to reduce a difference between the measured weld current and the selected weld current. Moving to decision diamond 414, if an indication to cease power to the weld wire is received by the control circuitry (e.g., user releases a trigger switch), advancing to block 416 the control circuitry causes power to the weld wire feed mechanism to cease, e.g., by stopping the weld wire feed (removing power to the weld wire feed mechanism). By stopping the wire feed the arc is extinguished and the current is terminated. If no indication to cease current to the weld wire is received, the method returns to decision diamond 410.

Figure 5:
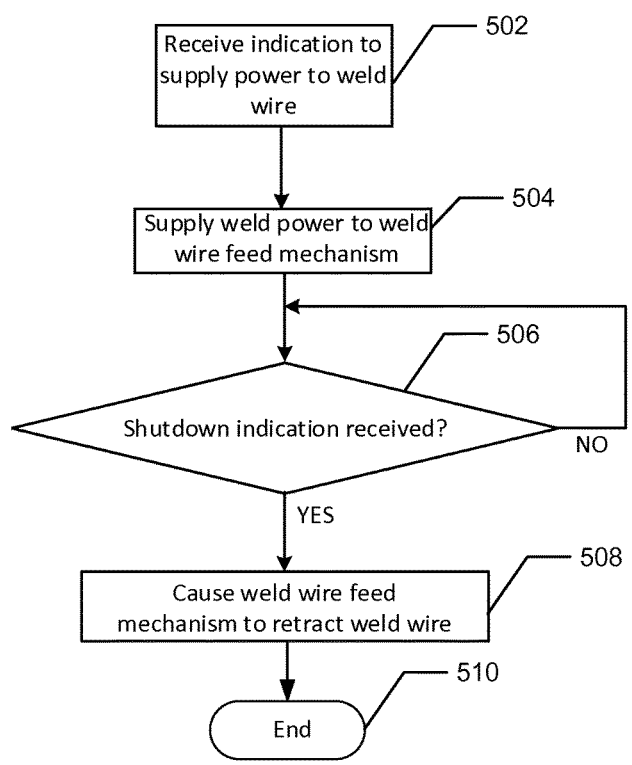
FIG. 5 is a flow diagram of a method, according to another embodiment.

FIG. 5 is a flow diagram of a method, according to another embodiment. Method 500 begins at block 502, where control circuitry receives an indication to supply power to weld wire of an arc welder. Continuing to block 504, the control circuitry couples a battery to the weld wire. For example, the control circuitry may receive an indication of a selected weld current (or a selected wire feed speed) that may be selected by a user.

Advancing to block 506, the control circuitry monitors input for an indication of a shutdown (e.g., user releases a trigger switch, or a low cell voltage indication is received by the control circuitry). If a shutdown indication is received, moving to block 508 safety logic of the control circuitry (e.g., hardware, software executed by hardware, firmware, or a combination thereof) causes a weld wire feed mechanism to retract exposed weld wire so that a leading portion of the weld wire is retracted to within a non-conductive sleeve inside the weld tip. The protective tip serves as a "cold tip" and prevents a safety hazard of accidental arcing. That is, by retracting the electrically active weld wire, the tip is isolated from the active wire preventing accidental arcing and possible subsequent damage to parts or equipment, injury or fire. The method ends at 510.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the scope of the present invention.

What is claimed is:

1. A welding apparatus comprising:
   an automated wire feed mechanism to output wire at a wire feed rate, wherein the wire is to provide a welding arc to a weld site and wherein the wire feed rate is based at least in part on selected power to be provided to the weld site; and
   a wire feed controller that includes wire feed circuitry to automatically adjust the wire feed rate to maintain the selected power provided to the weld site at approximately a pre-selected power value while the welding arc is provided to the weld site.

2. The apparatus of claim 1, further comprising a battery to provide the selected power, wherein the wire feed controller, the battery, and the automated wire feed mechanism are enclosed in a portable enclosure.

3. The apparatus of claim 1, wherein the wire feed controller is to cause the welding arc to extinguish by removing power to the automated wire feed mechanism responsive to an indication to extinguish the welding arc received from a user.

4. The apparatus of claim 1, wherein the pre-selected power value is based at least in part on input to be received from a user.

5. The apparatus of claim 1, wherein the rate of the wire feed is to be controlled automatically based at least in part on closed loop feedback to be received from a weld current sensor.

6. The apparatus of claim 1, wherein the wire feed controller is to automatically vary the wire feed rate over time to produce an intermittent welding arc.

7. The apparatus of claim 1, wherein the wire feed controller is to reverse a direction of the wire feed mechanism so as to reverse a direction of output of the wire responsive to a stop command received from a user.

8. The apparatus of claim 2, wherein the portable enclosure is less than or equal to 1200 cubic inches in volume.

9. The apparatus of claim 2, wherein the apparatus has an associated weight that is less than approximately 10 pounds.

10. The apparatus of claim 2, wherein the apparatus has an associated weight that is less than or equal to approximately six pounds and the portable enclosure is less than or equal to 200 cubic inches in volume.

11. A welding system comprising:
    a wire feed mechanism to output weld wire at a wire feed rate, wherein the weld wire is to enable welding by conducting electrical current to a weld site; and
    controller circuitry, wherein responsive to a stop indication to cease welding received from battery management logic, the controller circuitry is to cause the wire feed mechanism to cease output of the weld wire.

12. The system of claim 11, wherein the controller circuitry is to, responsive to the stop indication, cause the wire feed mechanism to reverse output of the weld wire.

13. The system of claim 11, further comprising a battery that includes at least one cell and the battery management logic to monitor a corresponding cell condition of each cell of the at least one cell, wherein responsive to receipt from the battery management logic of an unsafe cell condition in one of the at least one cell, the controller circuitry is to cause the wire feed mechanism to cease output of the weld wire.

14. The system of claim 13, wherein the system includes an enclosure to house the wire feed mechanism, the controller circuitry, the battery management logic and the battery, and wherein the enclosure has a size that is less than 200 cubic inches.

15. The system of claim 14, wherein the system has an associated weight that is less than or equal to approximately 6 pounds.

16. The system of claim 11, wherein the controller circuitry is to automatically control the wire feed rate to maintain the electrical current to be delivered by the wire at approximately a selected electric current, wherein the selected electrical current is to be selected based on input received from a user.

17. A method comprising:
    comparing, by controller circuitry, an electric current that flows through a wire of a weld circuit, to a selected electric current value; and
    responsive to a difference between the electric current and the selected electric current value, automatically adjusting, by the controller circuitry, a feed rate of the wire to be fed to a weld site to maintain the current that flows through the wire at approximately the selected electric current value.

18. The method of claim 17, further comprising responsive to an indication to open the weld circuit received by the controller circuitry, opening the weld circuit by the controller circuitry by removing power to a wire feed mechanism to stop the feed of the wire to the weld site.

19. The method of claim 17, further comprising responsive to an indication received by the control circuitry to open the weld circuit, reversing a direction of feed of the feed wire for a defined time period to cause the weld circuit to open.

20. The apparatus of claim 2, wherein the apparatus includes a weld gun that comprises another portable enclosure distinct from the portable enclosure and coupled to the portable enclosure via a cable, wherein the weld gun includes a weld wire spool motor to advance the wire responsive to an indication received from the wire feed controller.

* * * * *